(12) United States Patent
Linderwell

(10) Patent No.: US 9,903,680 B2
(45) Date of Patent: Feb. 27, 2018

(54) GUN REST

(71) Applicant: Aaron Linderwell, Manchester, IA (US)

(72) Inventor: Aaron Linderwell, Manchester, IA (US)

( * ) Notice: Subject to any disclaimer, the term of this patent is extended or adjusted under 35 U.S.C. 154(b) by 0 days.

(21) Appl. No.: 15/180,577

(22) Filed: Jun. 13, 2016

(65) Prior Publication Data
US 2017/0356714 A1    Dec. 14, 2017

(51) Int. Cl.
F41C 27/00    (2006.01)
F41A 23/06    (2006.01)
A01M 31/02    (2006.01)

(52) U.S. Cl.
CPC .............. F41A 23/06 (2013.01); A01M 31/02 (2013.01)

(58) Field of Classification Search
CPC ................................ F41C 23/16; F41C 33/001
USPC ............ 42/94; 248/163.1; 89/40.06; 73/167
See application file for complete search history.

(56) References Cited

U.S. PATENT DOCUMENTS

| | | | | | |
|---|---|---|---|---|---|
| 2,423,933 | A | * | 7/1947 | Gosh | A01K 97/10 248/231.71 |
| 2,606,731 | A | * | 8/1952 | Harris | A01K 97/10 211/70.8 |
| 3,302,910 | A | * | 2/1967 | Williams | F41A 23/08 248/126 |
| 3,532,309 | A | * | 10/1970 | Reddick | A01K 97/10 248/397 |
| 4,438,581 | A | * | 3/1984 | LaValle | F41A 23/00 42/94 |
| 4,531,643 | A | * | 7/1985 | Bradley | F16M 13/00 211/64 |
| 5,070,636 | A | * | 12/1991 | Mueller | F41A 23/16 42/94 |
| 5,375,337 | A | * | 12/1994 | Butler | F41A 23/16 33/506 |
| 5,481,817 | A | * | 1/1996 | Parker | F41A 23/02 248/286.1 |
| 5,715,625 | A | * | 2/1998 | West, III | F41A 23/16 42/94 |
| 6,898,893 | B1 | * | 5/2005 | Mukdaprakorn | A01K 97/10 248/518 |
| 6,920,713 | B1 | * | 7/2005 | Love | F41A 23/04 42/90 |
| 7,798,452 | B1 | * | 9/2010 | Wessells | F16M 11/10 248/163.1 |
| 9,417,025 | B1 | * | 8/2016 | McDonald | F41A 23/02 |
| 2007/0266609 | A1 | * | 11/2007 | Wuertz | F41A 23/04 42/94 |

(Continued)

Primary Examiner — Samir Abdosh
(74) Attorney, Agent, or Firm — Jerry D Haynes; Law Office of Jerry D Haynes

(57) ABSTRACT

A gun rest assembly that includes: a top bracket; a post supporting the top bracket; a connecting pivot at a distal end of the post; a connection clamp integrated with the connection pivot; and a release integrated with the connecting pivot, where the release and connecting pivot are adapted to open the connection clamp for placement on a stationary object based upon the depression of the release. The connection clamp preferably includes a beveled inner surface, where the connection clamp includes a first arm and a second arm. The gun rest assembly may further include a vertical extension, where the vertical extension is adapted for attachment to the connection clamp.

5 Claims, 1 Drawing Sheet

(56) References Cited

U.S. PATENT DOCUMENTS

| | | | | |
|---|---|---|---|---|
| 2009/0026679 A1* | 1/2009 | Harman, III | ............ | F41C 27/00 |
| | | | | 269/43 |
| 2010/0242332 A1* | 9/2010 | Teetzel | .................... | F41A 23/08 |
| | | | | 42/72 |
| 2010/0269393 A1* | 10/2010 | Bean | ....................... | F41A 23/06 |
| | | | | 42/94 |
| 2011/0308131 A1* | 12/2011 | McLinda | ................ | F41A 23/06 |
| | | | | 42/94 |

* cited by examiner

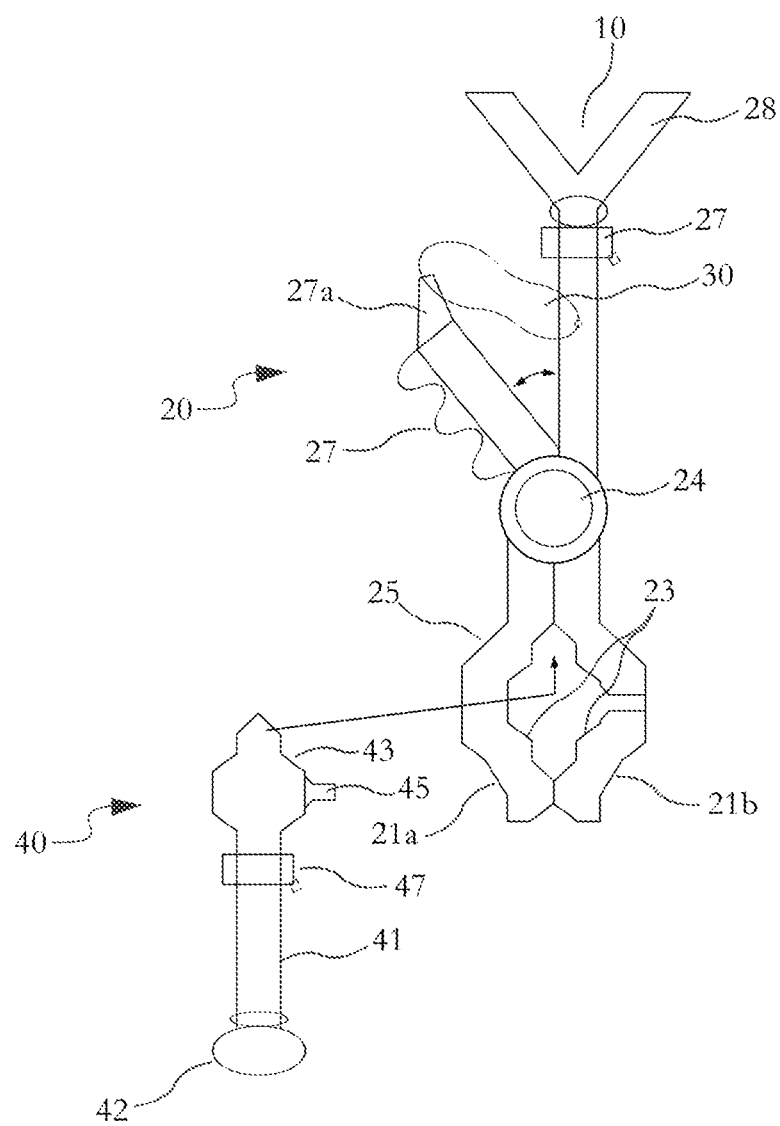

GUN REST

BACKGROUND OF THE INVENTION

Field of Invention

The present invention relates to a gun rest used gun support.

Description of Related Art

Many hunters use various stands in terms of tree stands, deer stands, and other staging areas in order to hunt and pursue wild game. Usually a deer or tree stand is equipped with some form of a shooting rail that allows the hunter to place their gun in a somewhat stationary position while shooting at a particular target. However, the use of the shooting rail on a typical deer stand has certain limitations. A shooting rail can be uncomfortable to use over a period of time and does not ensure the steadiness of the gun when placed on the rail. As a result, it would be advantageous to have a more stable gun support available for a hunter when shooting from a deer stand.

SUMMARY OF THE INVENTION

The present invention relates to a gun rest assembly that includes: a top bracket; a post supporting the top bracket; a connecting pivot at a distal end of the post; a connection clamp integrated with the connection pivot; and a release integrated with the connecting pivot, where the release and connecting pivot are adapted to open the connection clamp for placement on a stationary object based upon the depression of the release. The connection clamp preferably includes a beveled inner surface, where the connection clamp includes a first arm and a second arm. The gun rest assembly may further include a vertical extension, where the vertical extension is adapted for attachment to the connection clamp.

BRIEF DESCRIPTION OF DRAWINGS

FIG. 1 depicts a gun rest in accordance with the present invention.

DETAILED DESCRIPTION

The present invention relates to a gun rest that may be connected on to a shooting rail of a deer stand through the use of a connecting clamp. A connecting clamp on the gun rest allows for the gun support to be placed in a stationary position so that the hunter may use the gun support while hunting and shooting from a deer stand. Further, the gun support according to the present invention has a vertical extension that allows the gun support to be clamped on thereto and enables the hunter to use the gun support autonomously without clamping on to the rail of the deer stand. The gun support extension includes a base that stabilizes the gun support once assembled to the extension.

In reference to FIG. 1, a gun support 20 includes a top bracket 28 that is used as a primary support for a hunter's gun. Top bracket 28 includes a v-shaped opening 10 that allows the hunter to place a gun in the top bracket 28. The top bracket 28 is mounted on to a post 29 that may be adjusted vertically in height through the use of a twist lock 27. At the bottom of the post 29 is a connecting pivot 24 that includes a release 27 that rotates as shown in FIG. 1. The release 27 may be depressed by using so that it causes the opening of a connecting clamp 25. The connecting clamp 25 includes two arms 21a, 21b. The arms 21a, 21b surround an opening 23 that enables the placement of the connecting clamp 25 on to a stationary rail thus supporting the gun support 20 in a vertical position. The inside surface of the arms 21a, 21b are beveled as shown and includes an additional cylindrical opening 22 in arm 21b that is used in conjunction with a vertical extension 40 shown in FIG. 2. The user depresses the release 27 that opens the connecting clamp 25 and places the gun support 20 into position on the stationary rail. A strap 30 may be optionally placed on the post 29 to support the release 27 in a closed position at a top end 27a of the release 27.

The vertical extension 40 includes a head 43 that goes into the opening 23 of the connecting clamp 25. A stem 45 extending from the head 43 inserts into the cylindrical opening 22 and the gun support 20 is clamped on to vertical extension 40. Further, the vertical extension 40 is adjustable vertically through the use of a twist lock 47 that allows the extension of post 41 to a desired height. The post 41 rests upon a base 42 that is preferably a rubber grommet. This base 42 helps to keep the gun support and the vertical extension in a stationary position when used in accordance with the present invention. The instant invention has been shown and described in what it considers to be the most practical and preferred embodiments. It is recognized, however, that departures may be made there from within the scope of the invention and that obvious modifications will occur to a person skilled in the art.

What is claimed is:
1. A gun rest assembly comprising:
   a. a top bracket, wherein the top bracket includes a v-shaped opening;
   b. a post supporting the top bracket, wherein the post is adapted for vertical adjustment via use of a twist lock;
   c. a connecting pivot at a distal end of the post;
   d. a connection clamp integrated with the connection pivot, where the connection clamp includes a first arm and a second arm, where the second arm includes a cylindrical opening;
   e. a release integrated with the connecting pivot, where the release and connecting pivot are adapted to open the connection clamp for placement on a stationary object based upon the depression of the release; and
   f. a vertical extension, wherein the vertical extension includes a head and a horizontal stem horizontally extending from the head, where the head and horizontal stem insert between the first arm and second arm during use, wherein the stem is adapted for insertion into the cylindrical opening.
2. The gun rest according to claim 1, where the connection clamp includes a beveled inner surface.
3. The gun rest according to claim 1, where the vertical extension is adjustable in height.
4. The gun rest according to claim 3, where the vertical extension includes a base.
5. The gun rest according to claim 4, where the base is a rubber grommet.

* * * * *